United States Patent [19]

Hiestand

[11] Patent Number: 4,537,410
[45] Date of Patent: Aug. 27, 1985

[54] ARRANGEMENT FOR SUPPLYING A CHUCK WITH PRESSURE FLUID

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 613,288

[22] Filed: May 23, 1984

[30] Foreign Application Priority Data

May 27, 1983 [DE] Fed. Rep. of Germany ....... 3319228

[51] Int. Cl.³ .............................................. B23B 31/30
[52] U.S. Cl. ......................................... 279/4; 92/106; 277/74
[58] Field of Search ................ 279/4; 92/106; 91/420; 277/74

[56] References Cited

U.S. PATENT DOCUMENTS

| | | | |
|---|---|---|---|
| 3,545,342 | 12/1970 | Hiestand | 92/106 |
| 3,835,649 | 9/1974 | LeTestu | 279/4 |
| 4,014,311 | 3/1977 | Steere | 279/4 |
| 4,230,324 | 10/1980 | Derman | 277/74 |
| 4,434,990 | 3/1984 | Kobayashi | 279/4 |
| 4,482,162 | 11/1984 | Anegawa | 279/4 |

Primary Examiner—Jimmy C. Peters
Attorney, Agent, or Firm—McGlew and Tuttle

[57] ABSTRACT

In a power operated chuck, a radially elastically deformable seal ring is inserted in a recess of a pressure fluid supply ring embracing the chuck body. The seal ring comprises a stiff body portion in which passages are provided for the pressure fluid, and laterally projecting fins which are elastically deformable in the radial direction of the chuck and apply against the supply ring. In an unloaded state, the seal ring is under slight bias applied against the supply ring and spaced from the circumferential surface of the chuck body. The area of the outer circumferential surface of the seal ring, exposed to the inflowing pressure fluid, is larger than the ring area on the inside circumference which is exposed to fluid pressure from the inside. The design makes it possible to transfer, in a short period of time, a large amount of pressure fluid into the chuck. Also, the seal ring disengages from the chuck body abruptly.

16 Claims, 4 Drawing Figures

ARRANGEMENT FOR SUPPLYING A CHUCK WITH PRESSURE FLUID

FIELD AND BACKGROUND OF THE INVENTION

The present invention relates in general to power activated chucks, and in particular to a new and useful pressure fluid supply arrangement for chucks or similar structures which utilizes an elastically deformable seal ring.

A supply arrangement of this kind is known from German Pat. No. 16 02 813 and its corresponding U.S. Pat. No. 3545342 and have proved extraordinarily satisfactory in practice for years. The elastically deformable seal ring employed in this connection is provided with at least one passage opening designed as a throttle, and is inserted in biased state in an annular groove of a supply ring. During a pressure fluid transfer, to deform the seal ring and apply it against the circumferential surface of the chuck body, first, a certain pressure must be built up in the outer zone of the circular groove. To this end, a strong frictional force must be overcome in addition, since the seal ring applies under bias against the annular groove laterally too. This extends the time necessary for a clamping operation. Further, experience has shown that the seal ring is sometimes lifted for a short time from the circumferential surface of the chuck body, since the inner surface areas and the outer surface areas exposed to pressure during a pressure fluid transfer are almost equal in size, which results in an equalization of the pressure. This causes a sideward outerflow of the pressure fluid and, consequently, a pressure loss. Also, with the seal ring lifted, cooling water and/or chips may penetrate into the annular groove and therefrom, under supply pressure, even into the chuck and cause disturbances. Moreover, if the seal ring becomes deformed more in the middle than in the two outer portions, and thus becomes cambered, it frequently doesn't apply flatly against the chuck body. This again may unfavorably affect the pressure fluid supply. Further, particularly in chucks having a large outer diameter, the seal ring cannot be lifted satisfactorily because it is too heavy, and its side friction in the annular groove of the supply ring is too strong.

SUMMARY OF THE INVENTION

The present invention is directed to an arrangement of the above mentioned kind for permitting a quick operation, thus minimizing the time needed for clamping a workpiece, and reliably preventing the seal ring from being lifted during the pressure fluid transfer from the circumferential surface of the chuck body. The seal ring is to apply against this circumferential surface quickly and firmly, without cambering. Further, upon terminating the pressure fluid transfer, the seal ring is to return quickly, abruptly, and to a satisfactory extent. Cooling water and/or chips are to be prevented from penetration through the passages for pressure fluid into the annular groove, and especially, it must be ensured that during a pressure fluid transfer, the pressure fluid can flow through the seal ring unobstructed and in a large amount, so as to produce the pressure in a pressure space of the chuck in a short time. Finally, the depressurized fluid must be permitted to flow out rapidly, through a large annular gap between the circumferential surface of the chuck body and the supply ring.

Accordingly, an object of the present invention is to provide a pressure fluid supply arrangement, which is in particular for a chuck having at least some internal movable parts, comprising a body member having a longitudinal axis defining a pressure chamber and having an outer annular surface with a passage communicating the outer surface with the pressure chamber, a supply ring extending around the body member and defining an annular chamber communicating with the outer surface and adjacent the passage with a port for supplying pressure fluid to the pressure chamber through the annular chamber and the passage, the supply ring having an inner surface in the annular chamber spaced from the outer surface of the body member, and an annular seal ring disposed in the annular chamber. The seal ring is elastically deformable to change in diameter for movement from the inner to the outer surface will supply of pressure fluid to the pressure chamber, for establishing a seal against the outer surface. The annular seal ring has a cross section which is substantially rectangular and has opposite radial surfaces from which project radially elastically deformable fins. A ring passage is defined through the ring for communicating the annular chamber adjacent its inner surface with the pressure chamber of the body member and the annular seal ring is biased, in particular through the fins, against the inner surface when no pressure fluid is being supplied.

A further object of the invention is to provide the annular chamber in the form of a groove having recesses which each receive one of the fins.

A still further object of the invention is to position the seal ring in the annular chamber with the fins in a biased state so that the seal ring exerts a force against the inner surface of the annular chamber.

Another object of the invention is to provide recesses in the seal ring adjacent to base of each of the fins to increase the elasticity of each fin.

To ensure that, during the supply of pressure fluid, the fins will bind pressure-tightly against the outer surface of the body member, contact surfaces in the recesses of the annular chamber are inclined at an angle which is preferably about 30° with respect to the longitudinal axis.

Another object of the invention is to provide the seal ring with an outer annular surface which is from one and a half to four times larger in area than an inner annular surface thereof so that when the surfaces are exposed to pressure fluid, the seal ring will firmly seal against the outer surface of the body member.

Further, to expose in a simple way a large surface of the pressure fluid flowing into the annular chamber, surfaces of the recesses in the annular chamber are shaped to be engaged with the sides of the fins for increasing the sealing effect of the seal ring.

This may easily be done by giving the annular groove of the supply ring a T-shaped cross section, with the body of the seal ring being received by its inside portion in the radially inner, necked portion of the groove, while its outer portion and the fins are received in the radially outer, wider portion of the T groove.

According to another object of the invention, projections are provided on the outer surface of the body member which engage with the inner surface of the seal ring when pressure fluid is supplied.

A still further object of the invention is to provide such a device wherein the annular chamber, in the form of a T-shaped annular groove, guides a portion of the seal ring body toward the outer surface of the body member.

A still further object of the invention is to provide the seal ring passage, or a plurality of the seal ring passages with bushings which are inserted in the passages, each provided with a collar that establishes a space between the outer surface of the seal ring and the inner surface of the supply ring around a passage in the supply ring for the pressure fluid, when no pressure fluid is being supplied.

The pressure fluid supply arrangement according to the invention is simple in construction and thus inexpensive to manufacture and, primarily, reliable in operation, i.e. the pressure fluid is always reliably transferred. That is, by providing a rigid ring body with passages for the pressure fluid and with laterally projecting elastic fins, and applying the ring under a slight bias against the peripheral inner surface of the annular groove, with the radially outer, exposed surface of the ring being larger than the radially inner one, it is made sure that the supplied fluid will instantly press the seal ring with a strong force against the circumferential surface of the chuck body, yet be capable of substantially unobstructedly flow through the passages provided in the ring. Since the radially outer surface of the ring body is relatively large, while the elastic force to be overcome of the fins is small, there is no need for dimensioning the flow passages as throttles to build up the pressure. The seal ring is rather instantly deformed by the inflowing pressure fluid and applies flatly against the chuck body without cambering its body.

The flow passages allow a pressure fluid transfer at a considerable rate so that the pressure in the respective pressure space of the chuck builds up rapidly. This considerably reduces the time for effecting a clamping operation. It is further ensured that the rigid ring body will not lift from the chuck body during the fluid transfer, not even partly. Upon terminating the pressure fluid transfer, however, the seal ring automatically returns into its initial position, and the depressurized fluid can freely flow out through the annular gap between the chuck body and the supply ring. The seal ring cannot be damaged by the rotating chuck body. Further, no lubricant can accumulate behind the seal ring and penetrate into the low passages into the chuck body, since the seal ring applies against the peripheral inner surface of the annular groove. The invention thus guarantees a disturbance free operation over a long period of time.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, one embodiment of the invention is explained in more detail with reference to the drawings in which.

DESCRIPTION OF THE PREFERRED EMBODIMENTS

Figure 1:
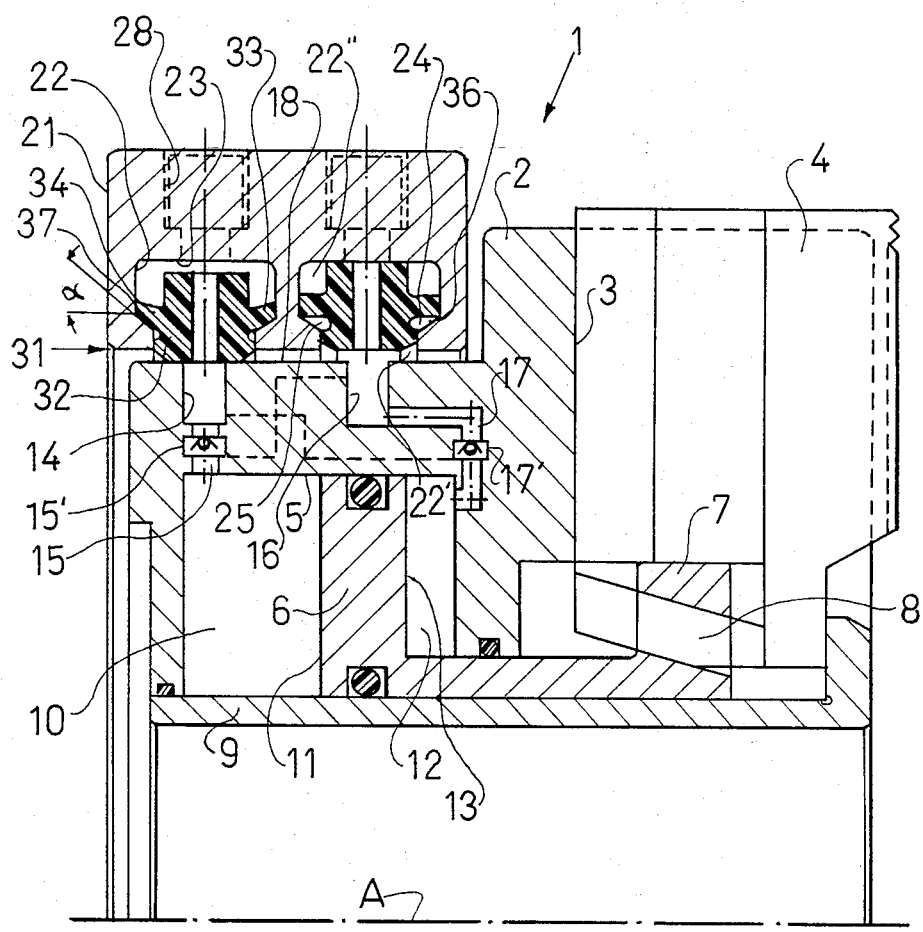
FIG. 1 is an axial sectional view of a pressure-operated chuck equipped for pressure fluid supply.
Figure 2:
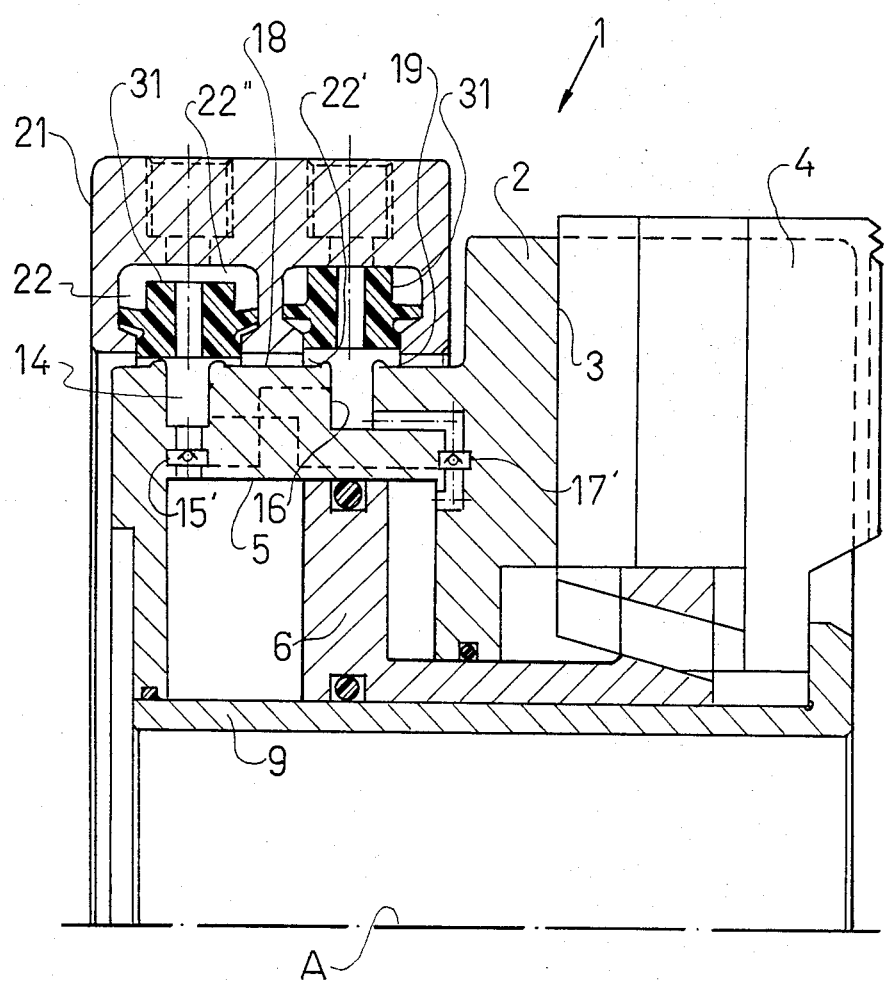
FIG. 2 is a view similar to FIG. 1 showing another design of the transfer region.

The power operated chuck generally designated 1 and shown in FIGS. 1 and 2, substantially comprises a chuck body or body member 2, master or gripping jaws 4 received for displacement in radial grooves 3 of body 2, and a circular piston 6 which is received in a cylindrical chamber 5 for displacement in the axial direction A of chuck 1 and positively engaged, through wedge hooks 8 formed thereon, with wedge hooks 7 which are provided on jaws 4. Cylindrical chamber 5 which is provided in chuck body 2 and subdivided by piston 6 into two pressure spaces 10,12 and grooves 3, are bounded at their insides by a sleeve 9.

Pressure fluid is supplied to pressure spaces 10,12 through circular grooves 14,16 which are provided in the circumferential surface 18 of chuck body 2, and through passages 15 and 17 communicating therewith. If the piston area 11 associated with pressure space 10 is exposed to the pressurized fluid, piston 6 is moved to the right and jaws 4 are pushed upwardly since the axial movement is transformed by wedge hooks 7,8 into a radial displacement. If piston area 13 associated with space 12 is exposed to the pressure, jaws 4 are retracted inwardly. To maintain the pressure in spaces 10 or 12 built up by the pressure fluid supply, indicated controllable check valves 15', 17' are provided in passages 15 and 17.

Figure 4:
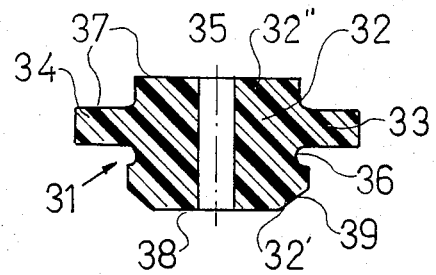
FIG. 4 is a sectional view of the seal ring in the design according to FIG. 1.

To alternately direct the pressure fluid into circular grooves 14 or 16, a fixed supply ring 21 is provided embracing chuck body 2, in which seal rings 31, radially deformable by the pressure fluid, are inserted in two circular grooves 22. As shown particularly in FIG. 4, each of the seal rings 31 comprises a rectangular stiff shaped body 32 and elastically deformable fins 33, 34 which project therefrom about centrally and engage recesses 24,25 provided in supply ring 21, and bear against the ring. As shown in FIG. 1 at the right hand side of supply ring 21, seal rings 31 are inserted in the T section circular grooves 22, 22' in slightly biased state, so that if not loaded, they apply against the peripheral inside surface 23 of the grooves 22. Seal rings can be made, for example, of resilient plastic or rubber material.

Seal rings 31 are provided with radial passages 35 for the pressure fluid, which are not designed as throttling bores, but enable the fluid to flow therethrough almost without resistance. The outer, peripheral surface 37 of seal ring 31 has an area about three times the inner circumferential surface 38 thereof, so that upon supplying pressure fluid, seal ring 31 instantly and sealingly applies against circumferential surface 18 of chuck body 2. This means, of course, that seal ring 31, which is guided by its portion 32' for displacement in portion 22' of T-shaped groove 22, is shifted inwardly and elastic fins 33, 34 apply sealingly against faces 36,37 slanting at an angle $\alpha$ of about 30°, of recesses 24,25, as shown in the left hand portion of supply ring 21 in FIG. 1. This prevents pressure fluid, which has been supplied through flexible tubes screwed into connection ports 28, from escaping past seal ring 31. Recesses 36 are provided in body 32 of the seal rings, to improve the elastic deformation of seal rings 31 in the radial direction.

By providing circular grooves 22 with a T cross section, and with the outer portion 32" and the fins 33, 34 of ring body 32 extending in the outer portion 22″ of the grooves, a large outer surface area 37 is obtained against which the pressure fluid can act. That is, as soon as seal ring body 32 is pushed away by the pressure fluid from peripheral inside surface 23 of supply ring 21, the outer areas of fins 33 and 34 become exposed to the pressure. Seal ring 31 is thus quickly pressed radially inwardly, against circumferential surface 18 of chuck body 2, and a reliable transfer of pressure is thereby insured.

To reduce the inside area 38 of seal ring 31, which, upon a pressure fluid supply, is exposed to pressure from the inside, chamfers 39 are provided on ring 31. The pressure acting on seal ring 31 from the inside is thus limited to the pressure building up in circular grooves 14,16. A further advantage thereby obtained is that upon releasing the pressure, the operating fluid flowing out can escape rapidly through the gap forming between circumferential surface 18 of chuck body 2 and supply ring 21. For the same purpose, elevations 19 may be provided adjacent annular grooves 14,16 on circumferential surface 18 of chuck body 2, as shown in FIG. 2. In such a design, during the pressure fluid supply, seal ring 31′ applies only against elevations 19. In FIG. 2 the same numbers are used to designate the same or similar elements.

Figure 3:
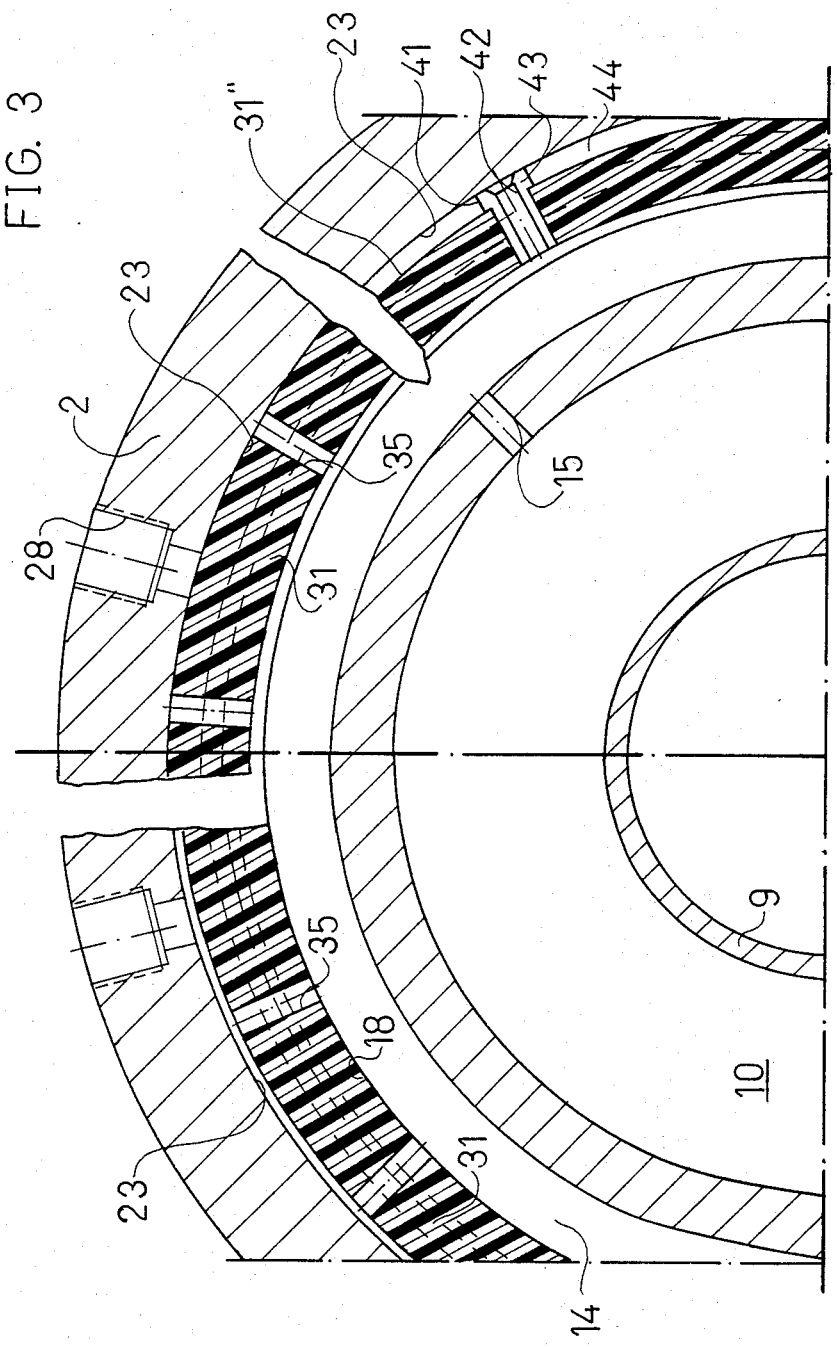
FIG. 3 are cross sectional views of the chuck according to FIG. 1 in two different positions, and further, with another seal ring arrangement.

FIG. 3 shows seal ring 31 in both its end positions. At the left, seal ring 31 is shown in its position according to FIG. 1 at the left, i.e. applied against the circumferential surface 18 of chuck body 2, which is the position during a pressure transfer. In the middle of FIG. 3, the right hand position according to FIG. 1 is shown, i.e. with the seal ring applying against the peripheral inner surface 23 of recess 22 of supply ring 21.

At the right hand side of FIG. 3, another arrangement is shown intended to permit the pressure to build up quickly at the outside of seal ring 31″ by temporarily preventing a flow through the regular passages provided in the ring. To this end, bushings 41 are inserted in seal ring 31″ having each a central passage hole 42 and a collar 43 and applying against the peripheral inner surface 23 of grooves 22 under the bias of seal ring 31″.

In this way, chambers 44 are formed into which the pressure fluid can penetrate. Thereby, seal ring 31″ is instantly exposed to pressure over the large area, and quickly displaced inwardly to apply against circumferential surface 18 of chuck body 2.

While specific embodiments of the invention have been shown and described in detail to illustrate the application of the principles of the invention, it will be understood that the invention may be embodied otherwise without departing from such principles.

What is claimed is:

1. A pressure fluid supply arrangement, comprising:
    a body member having a longitudinal axis, defining a pressure chamber and having an outer annular surface with a fluid passage communicating said outer surface with said pressure chamber;
    a supply ring extending around said body member and defining an annular chamber communicating with said outer surface adjacent said fluid passage, and with a port for supplying pressure fluid to said annular chamber and through said fluid passage to said pressure chamber, said supply ring having an inner surface in said annular chamber spaced radially outwardly from said outer surface of said body member;
    an annular seal ring disposed in said annular chamber and being elastically deformable for movement from said inner surface to said outer surface with supply of pressure fluid to said pressure chamber, with biasing means associated with said annular seal ring for biasing said seal ring in a direction toward said inner surface, said seal ring having a ring body portion with a substantially rectangular cross section and defining a ring passage for communication between said annular chamber and said fluid passage, said ring body portion having opposite substantially radial surfaces extending substantially perpendicular to said longitudinal axis of said body member, and a radially elastically deformable fin projecting from each of said radial surfaces.

2. An arrangement according to claim 1, wherein said annular chamber of said supply ring incudes a pair of recesses, one of said fins extending to each recess and engaged with said supply ring to form said biasing means for biasing said annular seal ring toward said inner surface of said supply ring.

3. An arrangement according to claim 2, wherein said fins are disposed in said annular chamber of said supply ring in a biased state to exert pressure on said annular seal ring toward said inner surface of said supply ring.

4. An arrangement according to claim 1, wherein said annular seal ring includes a recess at a base of each fin adjacent each respective radial surface for increasing an elastic deformability of each fin with respect to said ring body portion.

5. An arrangement according to claim 3, wherein each recess of said annular chamber defines an inclined surface against which each respective fin is engageable with supply of pressure fluid, each inclined surface extending at an acute angle with respect to said longitudinal axis.

6. An arrangement according to claim 5, wherein said acute angle is about 30°.

7. An arrangement according to claim 1, wherein said annular seal ring has an outer surface facing said inner surface of said supply ring and an inner surface facing said outer surface of said body member, said outer surface of said seal ring being from 1.5 to four times larger than said inner surface of said seal ring.

8. An arrangement according to claim 7, wherein said annular chamber of said supply ring includes a recess for each fin, at each axial side of said annular chamber, said outer surface of said seal ring adapted to engage and seal against said inner surface of said annular chamber when no pressure fluid is being supplied with said inner surface of said seal ring being engaged with said outer surface of said body member with supply of pressure fluid, said recesses of said annular chamber communicating with said port of said supply ring when pressure fluid is supplied.

9. An arrangement according to claim 8, wherein said annular chamber has a T-shaped cross section with arms of said T-shaped cross section forming said recesses of said annular chamber and a base of said T-shaped cross section lying adjacent said fluid passage, said seal ring having an inner portion carrying said inner surface of said seal ring which is slidably guided in said base portion of said T-shaped cross section toward and away from said outer surface of said body member.

10. An arrangement according to claim 9, wherein each of said arm portions of said T-shaped cross section carries an inclined surface inclined at about 30° with respect to said longitudinal axis, against which each respective fin is engageable with supply of pressure fluid.

11. An arrangement according to claim 1, including a pair of axially spaced radial protrusions defined on said outer surface of said body member on either side of said fluid passage engageable with an inner surface of said seal ring with the supply of pressure fluid for moving said seal ring ports at outer surface of said body member.

12. An arrangement according to claim 1, wherein said ring body portion of said seal ring includes a camfer on either side of an inner surface of said seal ring which is adapted for movement toward said outer surface of said body member with supply of pressure fluid.

13. An arrangement according to claim 1, wherein said annular chamber includes a guide portion adjacent said fluid passage, said ring body portion being at least partly slidably guided in said guide portion toward and away from said outer surface of said body member.

14. An arrangement according to claim 1, including a bushing in said ring passage of said annular seal ring, said bushing having a collar extending radially outwardly of said seal ring and engageable against said inner surface of said annular chamber and around said port when no pressure fluid is being supplied, said bushing defining a hole therein and through said ring passage for passing pressure fluid to said pressure chamber of said body member.

15. An arrangement according to claim 1, wherein said body member comprises a chuck member, a piston slidably mounted in said pressure chamber for movement with supply of pressure fluid to said pressure chamber for movement with supply of pressure fluid to said pressure chamber and a clamping jaw engaged with said piston for movement with movement of said piston.

16. In a pressure fluid supply arrangement for chucks including a chuck body having a longitudinal axis, a pressure proof connection for transferring pressure fluid radially from a fixed supply ring to chuck parts in the chuck body to be temporarily moved, with an annular seal ring being inserted in the supply ring so as to surround a circumferential surface of the chuck body, which seal ring is elastically deformable to vary its diameter and, in an unload state, is in a position slightly spaced from the circumferential surface of the chuck body, the improvement comprising: the seal ring being formed of a ring body portion having a substantially rectangular cross section and being stable in its shape, cross sectional shape, and in which at least one flow passage for the pressure fluid is provided; a pair of fins formed on said ring body portion which projects from the opposite body surfaces of said ring body portion that are perpendicular to the longitudinal axis of the chuck body, about in a middle of said ring body portion; said fins being radially elastically deformable and bearing against the supply ring; said seal ring in the unloaded state being biased to sealingly apply against a peripheral inner surface of an annular groove provided in the supply ring; and said sealing ring having a radially outer seal ring surface parallel to the axis of the chuck body and exposable to the inflowing pressure fluid which has a larger area than a radially inner seal ring surface of said sealing ring to be exposed to the pressure fluid during and upon pressure fluid transfer.

* * * * *